(12) United States Patent
Lee (10) Patent No.: US 9,661,136 B2
(45) Date of Patent: May 23, 2017

(54) MOBILE DEVICE HAVING FUNCTION OF CONTROLLING CALL CONNECTION IN LOCK MODE BY USING VOICE SIGNAL

(71) Applicant: ADESIGN, Seoul (KR)

(72) Inventor: Yong Won Lee, Seongnam-si (KR)

(73) Assignee: ADESIGN, Seoul (KR)

(*) Notice: Subject to any disclaimer, the term of this patent is extended or adjusted under 35 U.S.C. 154(b) by 0 days.

(21) Appl. No.: 14/947,555

(22) Filed: Nov. 20, 2015

(65) Prior Publication Data

US 2016/0080569 A1    Mar. 17, 2016

Related U.S. Application Data

(63) Continuation-in-part of application No. 14/776,388, filed as application No. PCT/KR2013/012095 on Dec. 24, 2013.

(30) Foreign Application Priority Data

Mar. 15, 2013 (KR) .................. 10-2013-0028018

(51) Int. Cl.
  *H04M 3/42*   (2006.01)
  *H04M 3/493*  (2006.01)
  *H04W 4/16*   (2009.01)
  *H04M 3/428*  (2006.01)

(52) U.S. Cl.
  CPC ....... *H04M 3/4936* (2013.01); *H04M 3/4288* (2013.01); *H04W 4/16* (2013.01)

(58) Field of Classification Search
  CPC .... H04M 3/4936; H04M 3/4288; H04W 4/16
  (Continued)

(56) References Cited

U.S. PATENT DOCUMENTS 5,928,325 A * 7/1999 Shaughnessy ....... G06Q 10/107
                                                          709/206
6,078,809 A * 6/2000 Proctor .................. H04M 3/56
                                                          455/416

(Continued)

FOREIGN PATENT DOCUMENTS

KR  10-2008-0021882 A   3/2008
KR  10-2012-0091495 A   8/2012

OTHER PUBLICATIONS

International Search and Written Opinion issued in a corresponding application PCT/KR2013/012095 on Apr. 24, 2014.

*Primary Examiner* — Marceau Milord
(74) *Attorney, Agent, or Firm* — Roberts Mlotkowski; Safran Cole & Calderon P.C.

(57) ABSTRACT

The present invention relates to a mobile device having a function of controlling a call connection in a lock mode by using a voice signal. The mobile device includes: a keypad 110 which allows a user to input an execution command for setting a specific function or for performing a specific function; a controller 130 which performs a corresponding operation in accordance with the execution command input to the keypad 110, a preset internal function, or an execution command applied from the outside; a microphone 140 which allow the user to input a voice command under the control of the controller 130; a memory 160 stores at least one preset reference command under the control of the controller 130 and stores the voice command input through the microphone 140 under the control of the controller 130; an LED 180 which represents an operation state of the mobile device under the control of the controller 130; a wireless transceiver 190 which performs a voice call or a data communication between a transmitting terminal and a receiving mobile device; and a speaker 195 which outputs a specific operation state or a user's voice signal under the control of the (Continued)

controller 130. When the receiving mobile device receives an incoming call from any transmitting terminal in a lock mode, the controller 130 converts automatically the mobile device into a voice input mode for a predetermined period of time, and when it is determined that a specific voice command input by the user of the receiving mobile device in the voice input mode is successfully recognized by the receiving mobile device, the controller 130 controls the wireless transceiver 190 to control a call connection between the transmitting terminal and the receiving mobile device.

5 Claims, 5 Drawing Sheets

(58) Field of Classification Search
USPC ......... 455/414.1, 466, 433, 435.1, 560, 557, 455/412.1
See application file for complete search history.

(56) References Cited

U.S. PATENT DOCUMENTS

| | | | |
|---|---|---|---|
| 6,151,507 A * | 11/2000 | Laiho | H04L 12/5835 455/418 |
| 6,198,808 B1 * | 3/2001 | Martin | H04M 3/5307 379/88.11 |
| 6,198,916 B1 * | 3/2001 | Martin | H04M 3/436 379/215.01 |
| 7,177,670 B2 | 2/2007 | Yoon | |
| 7,650,170 B2 * | 1/2010 | May | H04M 1/6066 379/420.04 |
| RE42,831 E * | 10/2011 | Yoon | H04M 1/271 379/355.02 |
| 8,150,700 B2 | 4/2012 | Shin et al. | |
| 8,538,386 B2 * | 9/2013 | May | H04M 1/7255 455/412.2 |
| 8,682,374 B2 * | 3/2014 | Kim | H04M 1/271 370/296 |
| RE44,871 E * | 4/2014 | Yoon | H04M 1/271 379/354 |
| 8,798,237 B2 * | 8/2014 | Lee | H04M 1/271 379/88.03 |
| 8,868,136 B2 * | 10/2014 | Davidson | H04M 1/271 455/401 |
| 8,928,724 B2 * | 1/2015 | Jafry | H04M 1/67 348/14.02 |
| 9,204,267 B2 * | 12/2015 | Sturges | H04W 4/12 |
| 2010/0234051 A1 * | 9/2010 | Holden | H04B 1/3805 455/466 |
| 2010/0311399 A1 * | 12/2010 | Cusick | H04N 5/44543 455/414.2 |
| 2012/0306632 A1 * | 12/2012 | Fleizach | G06F 3/016 340/407.2 |

* cited by examiner

| COMMAND | REFERENCE DATA1 | REFERENCE DATA2 | REFERENCE DATA3 | TRANSMISSION TEXT |
|---|---|---|---|---|
| IMMEDIATE CALL | yeoboseyo | Hello | moshimoshi | |
| | nuguseyo | Who's calling | donatadesuka | |
| | annyounghaseyo | Who is this speaking | gonnichiwha | |
| CALL UNAVAILABILITY | hwoeuijoong | Meeting, Conference, council | kaigitsudesu | NOW IN CONFERENCE. I'LL CALL YOU AFTER A WHILE. |
| | unjeonjoong | In-operation, driving | untentsudesu | NOW IN CONFERENCE. I'LL CALL YOU AFTER A WHILE. |
| | jamkanman | Just a minute/ moment,/second | shosho omachikudasai | NOW DRIVING. I'LL CALL YOU AFTER A WHILE. |
| | jeonhwahalke | I will call you | denwhasuruyo | SORRY, I'LL CALL YOU AFTER A WHILE. |
| | gidaryeo | Wait, hold on | chiotomatte | SORRY, I'LL CALL YOU AFTER A WHILE. |

Fig. 5

| REFERENCE DATA | WORD-TYPE SIMILAR DATA | CHARACTER-TYPE SIMILAR DATA |
| --- | --- | --- |
| yeoboseyo | yeobuseyo, yeoboseyeo, eoboseyo | (yeo, eo, ryeo) (bo, beu, bu) (se, sae, seo, shi) (yo, o) |
| nuguseyo | nugeuseyo, nugusaeyo, neuguseyo | (nu, neu) (gu, u, geu) (se, sae, seo, shi) (yo, o) |
| annyounghaseyo | anyounghaseyo, annyuhaseyo, aneonghaseyo | (a, an) (young, nyoung, neong, nyeo, neo) (ha, a) (se, sae, seo, shi) (yo, o) |
| hwoeuijoong | hwoeijoong, hwoeuijoo, hoijoo | (hwoe, goe, ho) (ui, i) (joong, joo, tsoo, tsoong) |
| unjeonjoong | unjeonjoo, ujeonjoong, unjeojoong | (un, u, eun) (jeon, jeo, seon) (joong, joo, tsoo, tsoong) |
| jamkanman | jamganman, jakanman, jamkanma | (jam, ja, jja) (kan, gan, ka) (man, ma, an) |
| jeonhwahalke | jeonahalke, jeonnahalke, jeonhwahake | (jeon, jeo, seon) (hwa, ha, a) (hwa, ha, a) (hal, ha, a) (ke, kae, ge, gae) |
| gidaryeo | gidoryeo, gidayeo, gidari | (gi, ki, i) (da, dal, ta) (ryeo, yeo, reo, eo) |

MOBILE DEVICE HAVING FUNCTION OF CONTROLLING CALL CONNECTION IN LOCK MODE BY USING VOICE SIGNAL

TECHNICAL FIELD

The present invention relates to a mobile device having a function of controlling a call connection in a lock mode by using a voice signal, and more particularly to a mobile device having a function of controlling a call connection in a lock mode by using a voice signal, which is capable of connecting immediately a call by using a user's voice signal or of transmitting a message transmitting a call unavailability status when the mobile device receives a call under the condition that a lock function is difficult to unlock due to the impossibility of freely using both hands.

BACKGROUND ART

Recently, with the development of a mobile communication network and the development of the specification of a terminal, a mobile communication terminal has become an essential belonging of modern people with departing from a conventional simple communication device or an information providing device, and is evolving into a total entertainment device. Also, the rapid development of the communication technology extends the capability of the terminal. Accordingly, various user interfaces (UIs) and functions using the same are being provided.

Particularly, a terminal equipped with a touch screen provides a variety of locking/unlocking functions in order to limit unnecessary input errors in a standby mode. For the purpose of unlocking a lock mode (touch screen hold state), a user of a common terminal unlocks the lock mode by inputting a predefined password or a password defined by user's setting, or by using a separate key for unlocking the lock mode. That is, the lock set means that a user sets in advance a password having a predetermined number of digits (e.g., 4 digit number) for a menu, for example, call originating, call receiving, message receiving box check, wireless internet access, etc., and the user selects the menu and inputs the predetermined password, and only when the two passwords match each other, a lock function is unlocked and the user is allowed to normally use the terminal.

Figure 1:
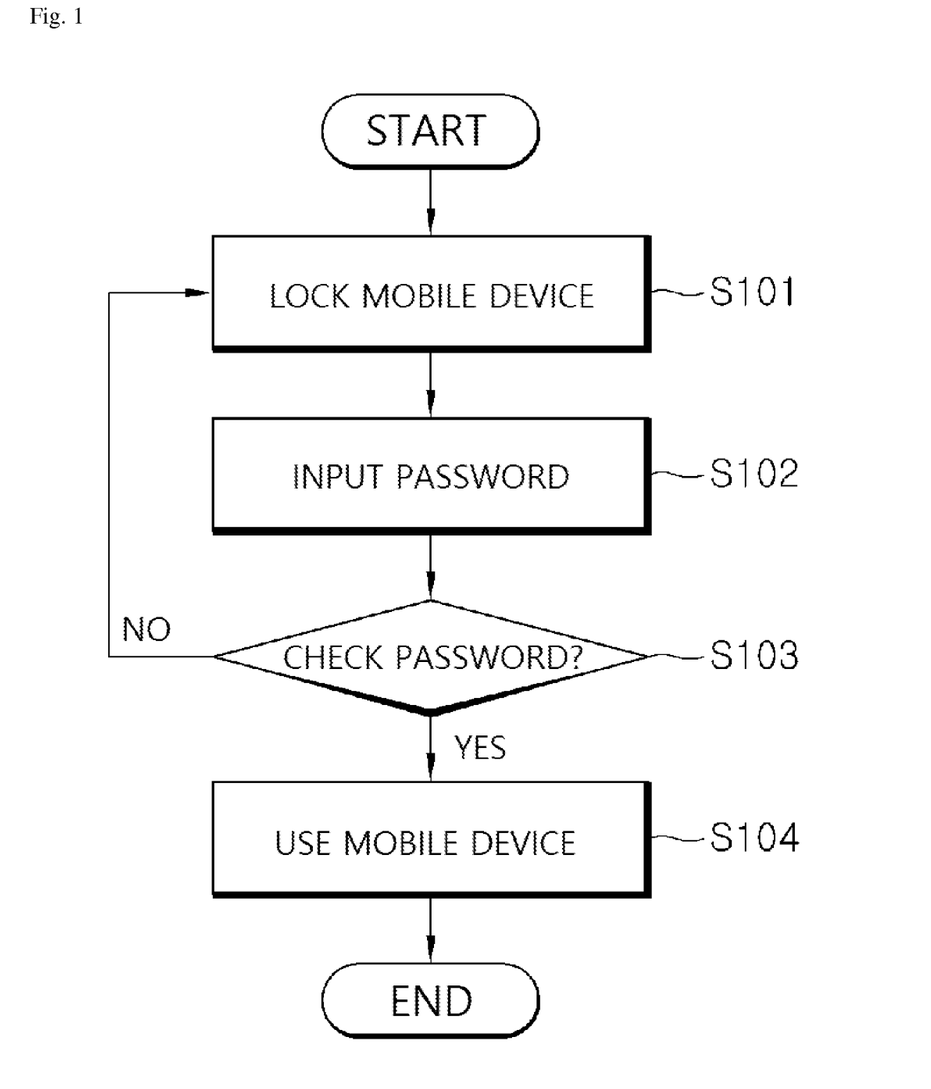
FIG. 1 is a flowchart for describing a conventional method for unlocking the lock of a mobile device.
Figure 2:
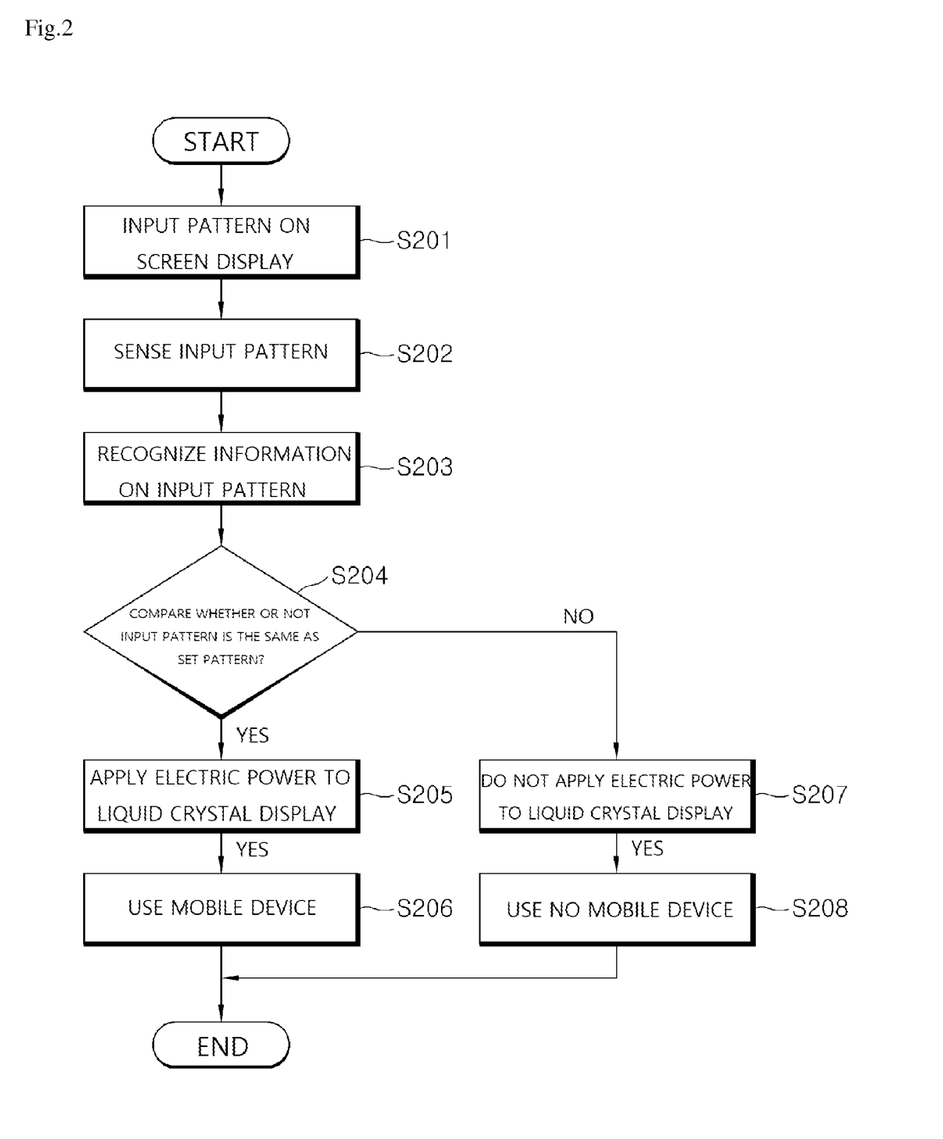
FIG. 2 is a flowchart for describing a conventional method for unlocking the lock of the mobile device.

FIGS. 1 and 2 are flowcharts for describing a conventional method for unlocking the lock of the mobile device. As shown in FIG. 1, in the past, in a case where a mobile device is locked (S101), when the user inputs a digit password by manipulating a keypad (S102), the terminal checks whether the user's input password matches the predetermined digit password or not (S103). Here, if the terminal determines that the inputted password matches the user-predetermined password, the terminal unlocks the lock, thereby allowing the user to use the mobile device (S104).

As shown in FIG. 2, in the past, when the user intends to use the mobile device, the user stores a particular pattern "P" by inputting a particular pattern "P" through touching a liquid crystal display in advance (S201). Then, the pattern "P" which has been inputted by touching the liquid crystal display is sensed by a touch sensor (S202), and a pattern recognizer recognizes information on the input pattern "P" (S203). A pattern comparator compares whether or not the information on the input pattern "P" is the same as information on the pattern predetermined by the user (S204). When the user touches the liquid crystal display 101 and inputs the pattern which matches the pattern predetermined in the mobile device 100, the lock is unlocked such that only authorized users are allowed to use the mobile device 100, so that personal information, etc., stored in the mobile device 100 can be protected (S206).

However, in the conventional technology, the user always has to input a digit password having any number of digits or to touch and input a particular pattern so as to use the mobile device. Also, when the mobile device receives a call under the condition that none of both hands are free, for example, at the time of driving or holding luggage with one hand, the lock cannot be unlocked and the call connection is not made, so that the user is reluctant to use the lock function.

Also, with the launch of a mobile phone capable of supporting a voice dialing, the mobile phone is divided into a mobile phone which can support the voice dialing and a mobile phone which cannot. Regarding the mobile phone which can support the voice dialing, a user stores a phone number to which the user wants to apply the voice dialing in a phone number memory, and then stores a user's starting voice for calling the stored phone number in the mobile phone.

However, the conventional technology is usable for transmitting a call by the mobile phone and is not usable for receiving a call by the mobile phone. Therefore, a user who urgently needs a call connection when the mobile phone receives a call under an unexpected condition avoids the mobile phone to which the conventional technology has been applied.

DISCLOSURE

Technical Problem

The object of the present invention is to provide a mobile device having a function of controlling a call connection in a lock mode by using a voice signal, which is capable of controlling a call connection between a receiving terminal and a transmitting mobile device through a user's voice signal in accordance with a current call state of a user when an incoming call is received in a state where a lock function has been set.

Another object of the present invention is to provide a mobile device having a function of controlling a call connection in a lock mode by using a voice signal, which is capable of increasing a probability of voice recognition success, when a voice command which transmits an immediate call status or a call unavailability status is input to the mobile device by a user.

Technical Solution

To accomplish the objective of the present invention, a mobile device having a function of controlling a call connection in a lock mode by using a voice signal is provided. The mobile device includes: a keypad 110 which allows a user to input an execution command for setting a specific function or for performing a specific function; a controller 130 which performs a corresponding operation in accordance with the execution command input to the keypad 110, a preset internal function, or an execution command applied from the outside; a microphone 140 which allow the user to input a voice command under the control of the controller 130; a memory 160 stores at least one preset reference command under the control of the controller 130 and stores the voice command input through the microphone 140 under the control of the controller 130; an LED 180 which represents an operation state of the mobile device under the control of the controller 130; a wireless transceiver 190 which performs a voice call or a data communication between a transmitting terminal and a receiving mobile device; and a speaker 195 which outputs a specific operation state or a user's voice signal under the control of the controller 130. When the receiving mobile device receives an incoming call from any transmitting terminal in a lock mode, the controller 130 converts automatically the mobile device into a voice input mode for a predetermined period of time, and when it is determined that a specific voice command input by the user of the receiving mobile device in the voice input mode is successfully recognized by the receiving mobile device, the controller 130 controls the wireless transceiver 190 to control a call connection between the transmitting terminal and the receiving mobile device.

Advantageous Effects

According to a mobile device having a function of controlling a call connection in a lock mode by using a voice signal, when an incoming call is received in a state where a lock function has been set, it is possible to control a call connection between a receiving terminal and a transmitting mobile device through a user's specific voice command in accordance with a current call state of a user. As a result, the user transmits a desired voice command out of a plurality of predetermined voice commands to the mobile device, thereby controlling the call connection of the mobile device in the lock mode even without using hands.

As a result, when an incoming call is received in an immediate call availability state, a call connection can be made between the receiving terminal and the transmitting mobile device. When an incoming call is received in a call unavailability status, a predetermined message transmitting the call unavailability status can be transmitted to the receiving terminal. Also, according to the mobile device according to the embodiment, a data similar to a reference command stored in a memory can be stored in advance in the memory. Therefore, in a case where a receiving mobile device receives an incoming call, when a specific voice command which instructs an immediate call status or a call unavailability status is transmitted to the mobile device by the user, a probability of voice recognition success can be increased.

MODE FOR INVENTION

Figure 3:
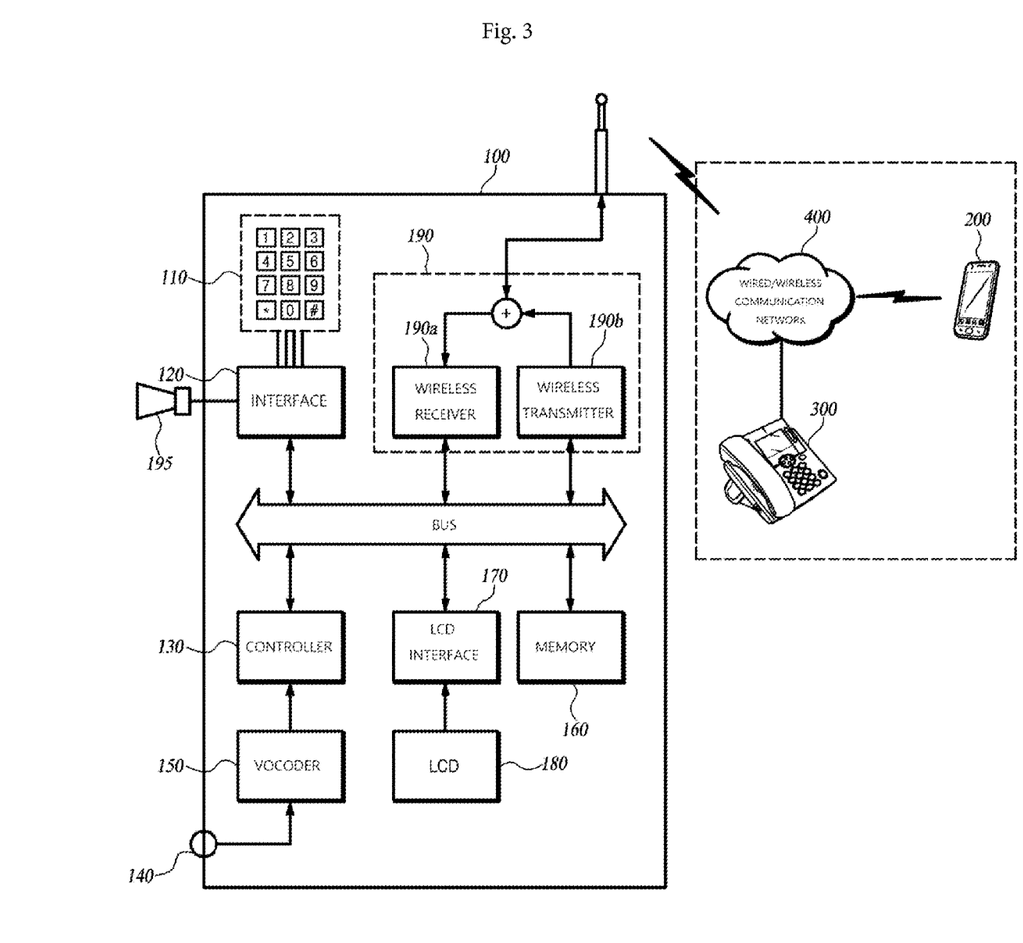
FIG. 3 is a block diagram of a mobile device having a function of controlling a call connection in a lock mode by using a voice signal in accordance with an embodiment of the present invention.

FIG. 3 is a block diagram of a mobile device having a function of controlling a call connection in a lock mode by using a voice signal in accordance with an embodiment of the present invention.

Referring to FIG. 3, the mobile device having a function of controlling a call connection in a lock mode by using a voice signal in accordance with the embodiment of the present invention includes a keypad 110 which allows a user to input an execution command for setting a specific function or for performing a specific function, a controller 130 which performs a corresponding operation in accordance with the execution command input to the keypad 110, a preset internal function, or an execution command applied from the outside, a microphone 140 which allow the user to input a voice command under the control of the controller 130, a memory 160 stores at least one preset reference command under the control of the controller 130 and stores the voice command input through the microphone 140 under the control of the controller 130, an LED 180 which represents an operation state of the mobile device under the control of the controller 130, a wireless transceiver 190 which performs a voice call or a data communication between a transmitting terminal and a receiving mobile device, and a speaker 195 which outputs a specific operation state or a user's voice signal under the control of the controller 130.

Here, the keypad 110 may be integrally configured through use of the liquid crystal display (LCD) 180 such that the user of the mobile device is able to input characters, numbers, and symbols, or may be configured as an individual keypad 110 apart from the LCD.

When the mobile device receives an incoming call in a lock mode, the microphone 140 as a voice input device is used to input the voice command so as to control the incoming call.

Figure 4:
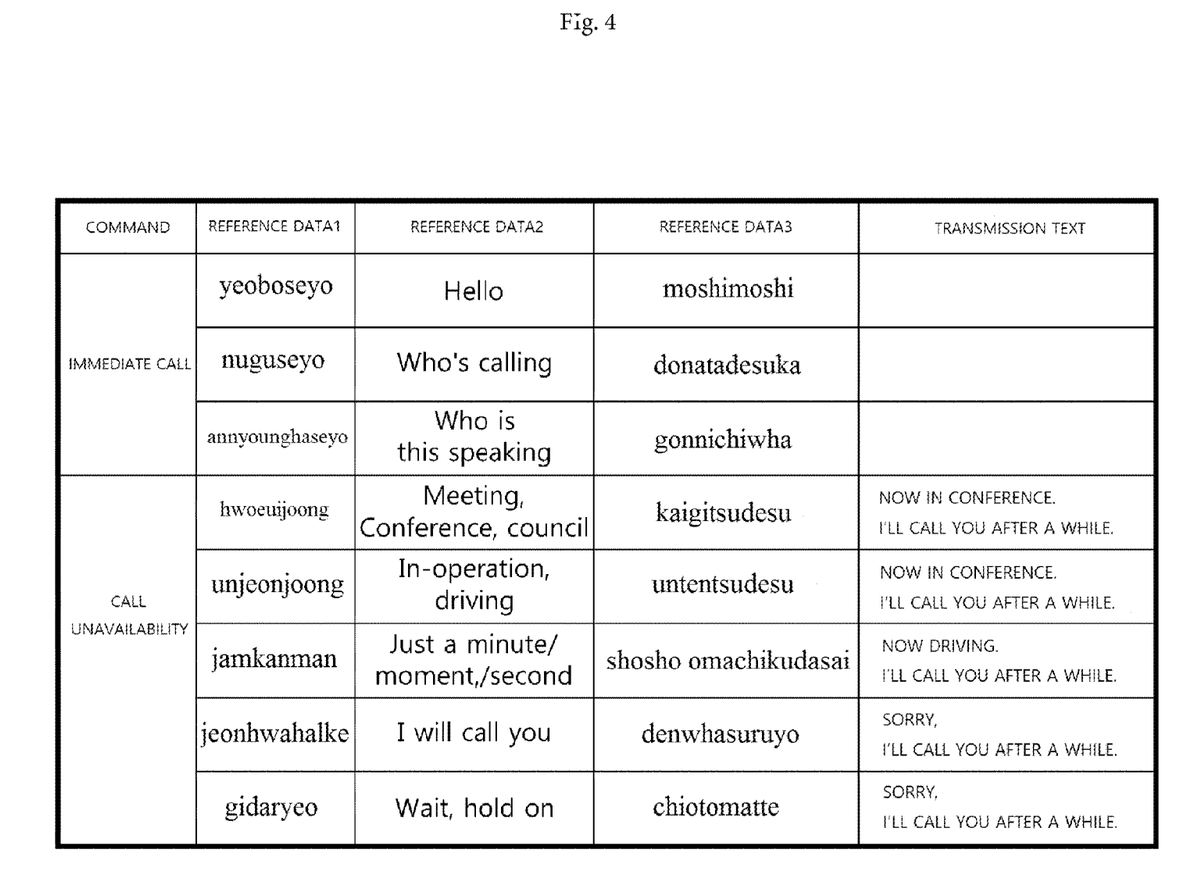
FIG. 4 shows embodiments of a word-type similar data which is stored in the mobile device having a function of controlling a call connection in a lock mode by using a voice signal in accordance with an embodiment of the present invention.

Meanwhile, the memory 160 of the mobile device stores, as shown in FIG. 4, the reference command representing an immediate call status or a call unavailability status. For example, the reference command representing the immediate call status such as "hello", "who are you", and "hi" may be stored. The reference command representing the call unavailability status such as "in conference", "driving", "just a minute", "I'll call you", "wait" may be stored. The reference command may be classified in English or Japanese in accordance with language environments of each country.

For example, when a user's voice command "hello" is input to the mobile device and it is determined that the reference command "hello" exists in the memory 160, the controller 130 determines that the immediate call is instructed to be performed. Then, the controller 130 connects a call between a transmitting terminal and a receiving mobile device, so that a voice call is made.

Meanwhile, when a user's voice command "in conference" is input and it is determined that the reference command "in conference" exists in the memory 160, the controller 130 determines that the call unavailability status is instructed to be transmitted. Then, the controller 130 transmits to the transmitting terminal a message which is previously stored in the memory 160 in advance and notifies the call unavailability status, and stops the call setup between the transmitting terminal and the receiving mobile device.

For example, when a user's voice command "in conference" is input and it is determined that the reference command "in conference" exists in the memory 160, the controller 130 determines that the call unavailability status is instructed to be transmitted. Then, the controller 130 transmits to the transmitting terminal a message which notifies the call unavailability status (for example, "I'll call you after a while").

Figure 5:
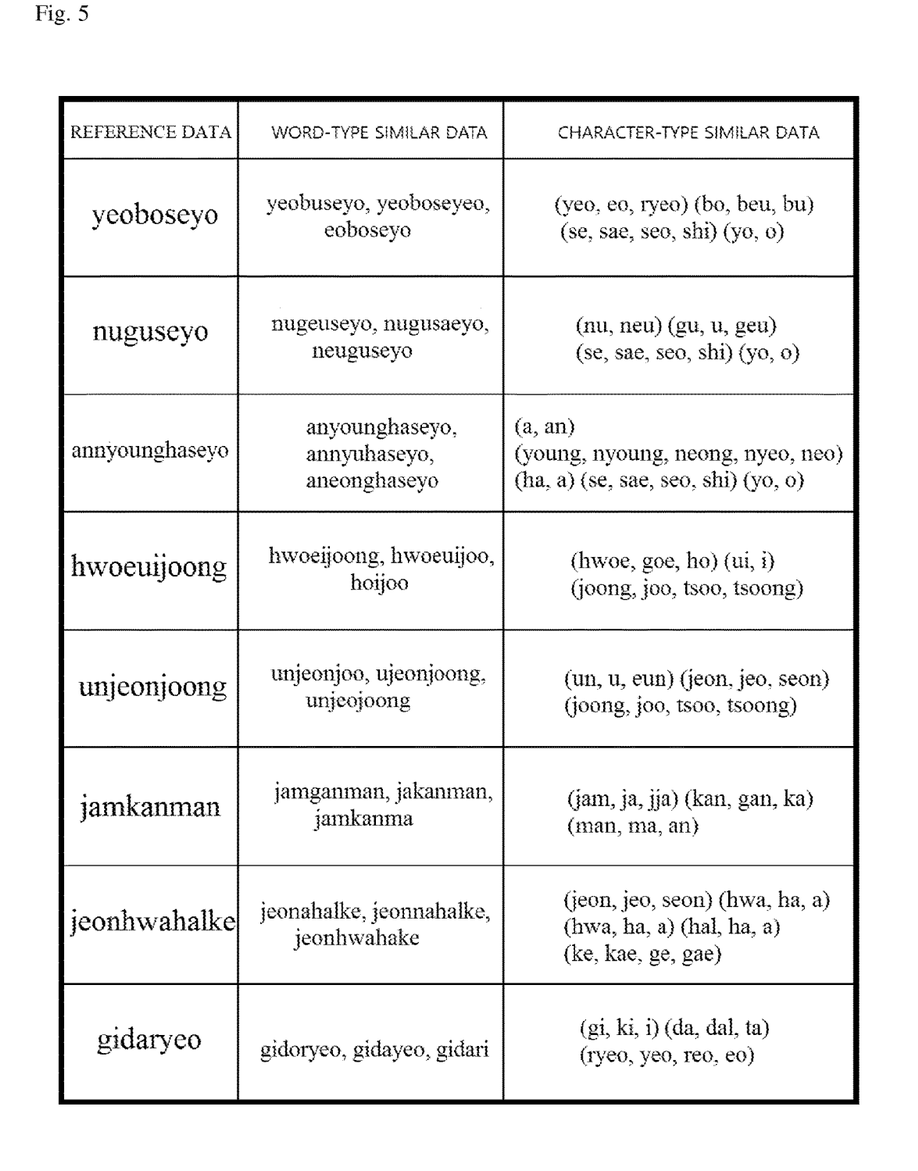
FIG. 5 shows embodiments of a character-type similar data which is stored in the mobile device having a function of controlling a call connection in a lock mode by using a voice signal in accordance with an embodiment of the present invention.

Here, when the voice command output by the user of the mobile device is recognized by the controller 130 of the mobile device and converted into text data, there may exist a recognition error or a conversion error. In order to minimize this error, the reference command which is stored in the memory 160 and represents the immediate call status and the call unavailability status may be, as shown in FIG. 5, may be extended to word-type similar text data and a character-type similar text data and stored.

As shown in FIG. 3, the word-type similar text data includes text data related to the word recognition error and conversion errors, which occur the most frequently. The character-type similar text data includes text data related to the recognition error and text error for each character. The reference command "hello" as an example of the word-type similar text data may be incorrectly recognized as "hallo" or "hollow", etc., by user's voice tone or intonation, etc., or may be incorrectly converted into a text. In the reference command "hello" as an example of the character-type similar text data, "hel" may be incorrectly recognized as "hal", "hol", "hul", etc., or may be incorrectly converted into a text. Therefore, by using this word-type similar text data or character-type similar text data, it is possible to minimize the recognition error and conversion error.

In a case where a wired or wireless transmitting terminal makes a call, when the controller 130 receives an incoming call through the wireless transceiver 190, the controller 130 outputs a ringtone or vibration set by the user through the speaker 195, and converts the mobile device into a voice input mode. As a result, when the user of the mobile device says a specific voice command, the controller 130 recognizes the corresponding voice command, converts the voice command into text data and stores in the memory 160, and then compares the text data with a plurality of reference commands stored previously in the memory 160.

Here, when it is determined that the input voice command is the same as or similar to the reference command stored in the memory 160, the controller 130 performs a control operation instructed by the corresponding reference command (call availability or call unavailability).

However, when it is determined that the input voice command is not the same as or similar to the reference command stored in the memory 160, the controller 130 notifies the user of a voice message notifying there is no reference command that matches the voice command (for example, "please input a voice command again") through the speaker 195, and then maintains the voice input mode for a predetermined period of time in order that the user's voice command can be input again.

Hereafter, the operation of the mobile device having a function of controlling a call connection in a lock mode by using a voice signal in accordance with the embodiment of the present invention will be described with reference to the accompanying drawings.

1. Reference Voice Command Registration

When the mobile device is manufactured or initially purchased, a manufacturer or a user controls the controller 130 to register, as shown in FIGS. 4 and 5, at least one reference command representing the immediate call status and the call unavailability status and similar commands respectively in the memory 160.

2. Voice Input Mode Automatic Conversion when Receiving an Incoming Call

As such, in a state where at least one reference command representing the immediate call status and the call unavailability status has been registered in the memory 160, when any transmitting terminal makes a call to the receiving mobile device, the receiving mobile device receives an incoming call.

Here, the controller 130 of the mobile device receives the incoming call through the wireless transceiver 190, outputs a ringtone or vibration preset by the manufacturer or the user through the speaker 195, and converts the mobile device into the voice input mode.

3. Input Voice Command Recognition

As a result, when the user of the mobile device says a specific voice command within a predetermined period of time, the controller 130 recognizes the corresponding voice command, converts the voice command into text data and stores in the memory 160, and then compares the text data with a plurality of reference commands stored previously in the memory 160.

Here, the controller 130 performs a comparison operation by using one of a one-to-one comparison and a similarity comparison. Through the one-to-one comparison, the controller 130 searches whether or not there exists a reference text data or a similar text data which matches the text data obtained by converting the voice command input by the user.

Here, the controller 130 determines whether or not there exists the reference text data or the similar text data which matches the text data obtained by converting the input voice command. More specifically, first, the controller 130 determines whether or not there exists the reference text data which is the same as the converted text data. Based on the determination result, if there exists the reference text data, the controller 130 determines that the recognition process is successful. If there exists no reference text data, the controller 130 determines whether or not there exists the similar text data by using the similarity comparison.

Here, according to the similarity comparison method, the controller 130 assesses a similarity between the converted text data and either the reference text data or the similar text data, and then selects the reference text data or the similar text data which has the highest similarity. When the highest similarity of the selected reference text data or similar text data exceeds a preset reference value, the controller 130 determines that the recognition is successful, and when the highest similarity of the selected reference text data or similar text data is less than the preset reference value, the controller 130 determines that the recognition is unsuccessful.

4. Control Operation According to the Recognition Success

When it is determined that the input voice command is the same as or similar to the reference command stored in the memory 160, the controller 130 performs the corresponding reference voice command (call availability or call unavailability).

That is, when the input voice command is one of voice commands instructing the performance of the "immediate call", the controller 130 connects a call between the transmitting terminal and the receiving mobile device, so that a voice call is made. When the input voice command is one of voice commands instructing the transmission of the "call unavailability status", the controller 130 transmits to the transmitting terminal a preset text which is previously stored in the memory 160 and notifies the "call unavailability status" (for example, "I'll call you later").

5. Control Operation According to the Recognition Failure

Meanwhile, when it is determined that the input voice command is not the same as or similar to the reference command stored in the memory 160, the controller 130 notifies the user of a voice message notifying there is no reference command that matches the voice command (for example, "please input a voice command again") through the speaker 195, and then maintains the voice input mode for a predetermined period of time in order that the user's voice command can be input again.

As a result, the user is able to input again his/her desired voice command through the microphone of the mobile device.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

The invention claimed is:

1. A mobile device having a function of controlling a call connection in a lock mode by using a voice signal, the mobile device comprising:
   a keypad which allows a user to input an execution command for setting a specific function or for performing a specific function;
   a controller which performs a corresponding operation in accordance with the execution command input to the keypad, a preset internal function, or an execution command applied from the outside;
   a microphone which allows the user to input a voice command under the control of the controller;
   a memory that stores at least one preset reference command under the control of the controller and stores the voice command input through the microphone under the control of the controller;
   an LED which represents an operation state of the mobile device under the control of the controller;
   a wireless transceiver which performs a voice call or a data communication between a transmitting terminal and a receiving mobile device; and
   a speaker which outputs a specific operation state or a user's voice signal under the control of the controller,
   wherein, when the receiving mobile device receives an incoming call from any transmitting terminal in a lock mode, the controller converts automatically the mobile device into a voice input mode for a predetermined period of time, and when it is determined that a specific voice command input by the user of the receiving mobile device in the voice input mode is successfully recognized by the receiving mobile device, the controller controls the wireless transceiver to control a call connection between the transmitting terminal and the receiving mobile device,
   wherein the controller determines whether the recognition process is successful or not according to whether or not there exist a command obtained by converting the voice command input by the user into a text data and a command registered previously in the memory in text or similar data, and
   wherein the controller determines whether or not there exists a reference text data which is the same as the converted text data, and wherein, based on the determination result, if there exists the reference text data, the controller determines that the recognition process is successful, and if there exists no reference text data, the controller determines whether or not there exists the similar text data by using a similarity comparison.

2. The mobile device of claim 1, wherein, in a case where the specific voice command input by the user is the same as the reference command registered in advance in the memory or is similar to the reference command within a preset reference value, when the controller determines that the recognition process is successfully performed, the controller (1) connects the call between the transmitting terminal and the receiving mobile device, or (2) controls the call connection between the transmitting terminal and the receiving mobile device in a manner of transmitting to the transmitting terminal a message which is previously stored in the memory and notifies a call unavailability status.

3. The mobile device of claim 1, wherein, when it is determined that the specific voice command input by the user of the receiving mobile device instructs an immediate call to be performed, the controller connects the call between the transmitting terminal and the receiving mobile device, so that the voice call is made.

4. The mobile device of claim 1, wherein, when it is determined that the specific voice command input by the user of the receiving mobile device instructs a call unavailability status to be transmitted, the controller transmits to the transmitting terminal a message notifying the call unavailability status.

5. The mobile device of claim 1, wherein, according to the similarity comparison, the controller assesses a similarity between the converted text data and either the reference text data or the similar text data, and wherein, when a highest similarity of the selected reference text data or similar text data exceeds a preset reference value, the controller determines that the recognition is successful, and when the highest similarity of the selected reference text data or similar text data is less than the preset reference value, the controller determines that the recognition is unsuccessful.

* * * * *